(No Model.)

J. M. RICHMOND.
STEAM VEHICLE.

No. 495,709.  Patented Apr. 18, 1893.

Witnesses  Inventor
Josiah M. Richmond.
By his Attorneys,

UNITED STATES PATENT OFFICE.

JOSIAH M. RICHMOND, OF RAYMOND, NEBRASKA.

STEAM-VEHICLE.

SPECIFICATION forming part of Letters Patent No. 495,709, dated April 18, 1893.

Application filed June 6, 1892. Serial No. 435,790. (No model.)

*To all whom it may concern:*

Be it known that I, JOSIAH MORTON RICHMOND, a citizen of the United States, residing at Raymond, in the county of Lancaster and State of Nebraska, have invented a new and useful Steam-Motor Machine, of which the following is a specification.

The invention relates to improvements in steam vehicles.

The object of the present invention is to provide for vehicles a steam motor adapted for propelling family carriages, wagons, street cars and similar conveyances, and capable of being attached to a plow or similar implement.

The invention consists in the construction and novel combination and arrangement of parts hereinafter fully described, illustrated in the accompanying drawings and pointed out in the claims hereto appended.

Figure 1:
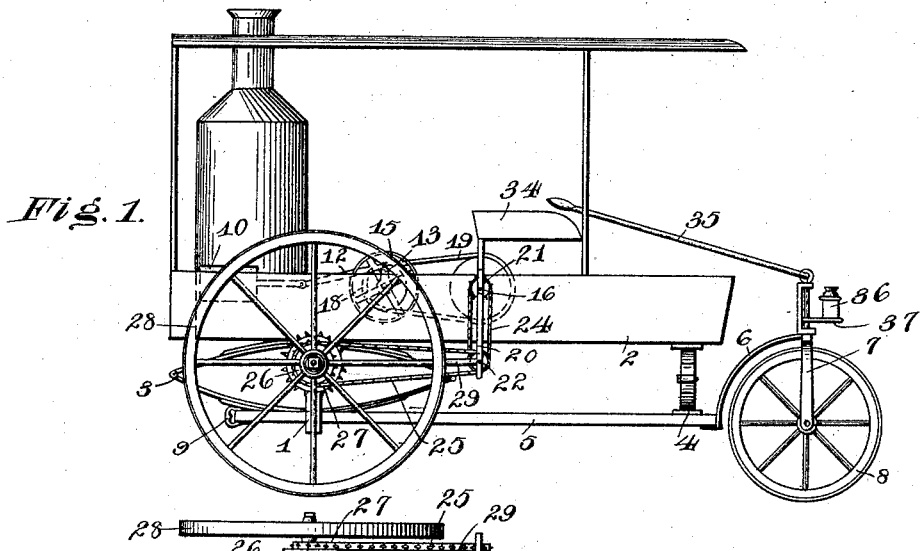
Figure 2:
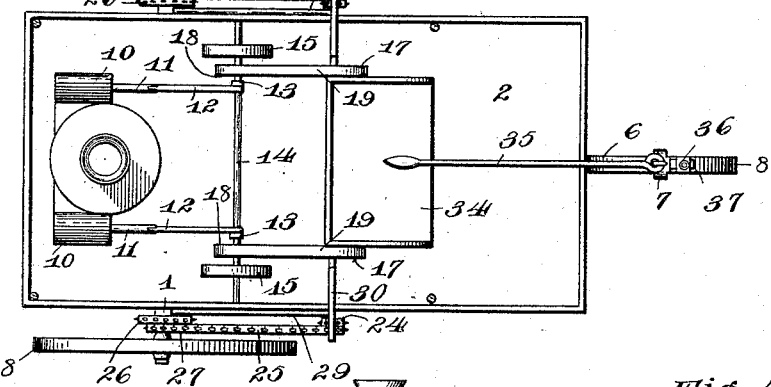
Figures 3, 4:
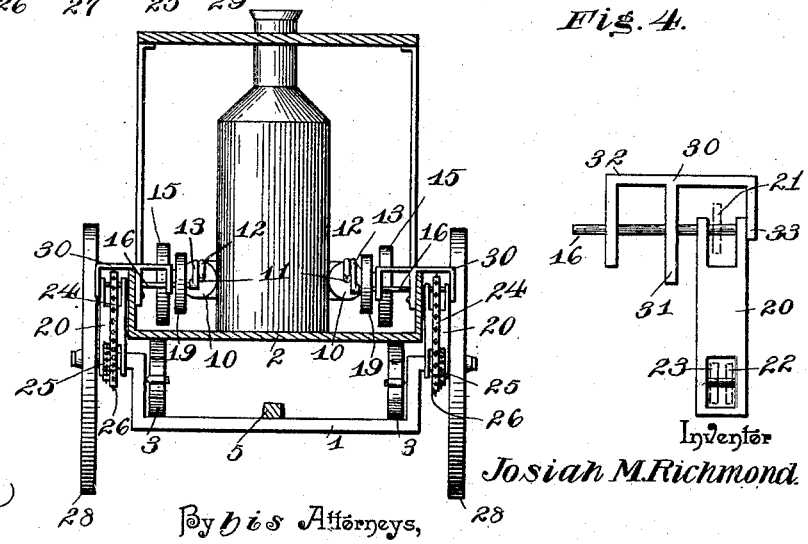

In the drawings—Figure 1 is a side elevation of a vehicle embodying the invention. Fig. 2 is a plan view. Fig. 3 is a transverse sectional view on line *x—x* of Fig. 1. Fig. 4 is a detail view showing one of the depending frames.

Like numerals of reference indicate corresponding parts in all the figures of the drawings.

1 designates a rear drop axle supporting a platform or vehicle bottom 2, between which and the drop axle are interposed rear elliptic side springs 3; the front end of the bottom of the body is supported by a single elliptic spring 4 which mounted on a reach bar 5; and the latter is connected by a curved arm 6 with the stem or standard 7 of a caster wheel 8, swiveled to the front end of the arm 6. The reach bar 5 has its rear end secured to the drop axle and projecting beyond the same and provided with a clevis 9 to enable a plow, or the like to be connected to the vehicle.

At the back of the body is mounted an engine which is provided at each side with a horizontal cylinder 10; and the piston 11 thereof is connected by a bar 12 with a crank 13 of a shaft 14, whereby the latter is rotated. The shaft 14 is provided at each end with a crank 13 and carries fly wheels 15, and communicates motion to opposite side shafts 16 by means of pulleys 17 and 18 and a belt 19. This gearing is arranged at the inner ends of the transversely disposed side shafts 16; and each of the latter has hingedly suspended from it a frame 20, which is provided at the upper and lower ends with recesses. A sprocket wheel 21 is mounted on the shaft 16 and arranged in the upper recess of the hinged frame 20, and located in the lower recess of the frame 20 are sprocket wheels 22 and 23, the former of which is connected by a sprocket chain 24 with the sprocket wheel 21. The other sprocket wheel 23 is connected by a horizontal sprocket chain 25 with gears 26 or 27 of a drive wheel 28. This drive wheel has different diameters of gears adjacent to its hub to enable the speed of the vehicle to be varied.

In order to maintain the sprocket chains and belts at the desired and uniform tension irrespective of the jolting of the vehicle, a stay 29 is arranged at each side of the vehicle. The front end of the stay is hingedly connected with the hinged frame 20, and the rear end of the stay is similarly attached to the drop axle.

The shafts 16 are journaled in approximately rectangular frames 30 which are secured to the body of the vehicle at the middle thereof; and each of the frames 30 comprise an inner vertical portion 31, and outwardly extending horizontal portions 32 arranged at the top of the portion 31 and a depending vertical portion 33 at the outer end of the portion 32.

Seats 34 may be conveniently secured to and supported by the frames 30.

A guide lever 35 is secured to and extends rearward from the upper end of the stem or standard of the caster wheel and terminates in front of the seats within easy reach of the occupants. A reflector 36 is mounted on the bearings 37 of the standard of the caster wheel.

The power of the engine varies with the character of the vehicle, and the forms of gearing may be varied by substituting sprocket gearing for plain belt or vice versa; and I desire it to be understood that changes in the form, proportion and the minor details of construction may be resorted to without departing from the principle or sacrificing any of the advantages of this invention.

What I claim is—

1. The combination of a vehicle, an engine mounted thereon, a shaft arranged in front of the engine and connected therewith, the opposite side shafts 16 arranged at the middle of the vehicle, gearing connecting the side shafts with the shaft in front of the engine, frames 20 hingedly connected to and depending from the shafts 16, and gearing connected with and supported by the lower ends of the hinged frames and receiving motion from the shafts 16 and connected with the vehicle wheels, substantially as described.

2. The combination of a vehicle, an engine mounted thereon, shafts 16 arranged at the sides of the vehicle and connected by gearing with the engine, depending frames hingedly connected to the shafts 16 and provided at their lower ends with sprocket wheels, sprocket wheels mounted on the shafts 16, gearing connected to the vehicle wheels, chains connecting said sprocket wheels and said gears, and stays hingedly connected to the lower ends of the hinged frames and to the vehicle, substantially as described.

3. The combination of a vehicle, the stationary rectangular supporting frames 30 secured to the sides of the vehicle, an engine mounted on the body of the vehicle, shafts 16 journaled in said frames 30, hinged frames 30 depending from said shafts 16 and provided at the top and bottom with recesses, sprocket wheels mounted on the shafts 16 and arranged at the bottoms of the hinged frames 20, different diameters of gears connected to the vehicle wheels, sprocket chains connecting the sprocket wheels together and with said gears, the stays hingedly connected with the frame 20 and to the axle of the vehicle, and means for connecting the shafts 16 with the engine, substantially as described.

JOSIAH M. RICHMOND.

Witnesses:
JENNIE RICHMOND,
ADA M. HALLER.